3,451,991
DISAZO DYESTUFFS CONTAINING THE PHENYL-
AZO-PHENYL-AZO-PHENYL MOIETY
Helmut Kleiner, Cologne-Riehl, Germany, assignor to
Farbenfabriken Bayer Aktiengesellschaft, Leverkusen,
Germany, a corporation of Germany
No Drawing. Filed June 16, 1965, Ser. No. 464,569
Claims priority, application Germany, June 27, 1964,
F 43,285
Int. Cl. C09b 31/02, 33/00, 35/00
U.S. Cl. 260—187                              6 Claims

ABSTRACT OF THE DISCLOSURE

Disazo dyestuffs, useful in the dyeing of polyesters and other hydrophobic fibers, having the formula:

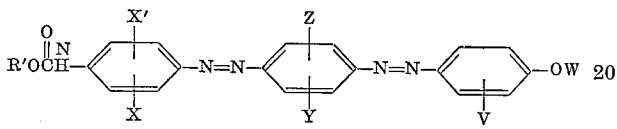

wherein R' is lower alkyl, X and X' are hydrogen, methyl, chloro and carbomethoxy, Y is hydrogen, methyl, methoxy, and cyanomethyl, Z is hydrogen and methoxy, W is hydrogen and methyl, and V is hydrogen, methyl, chlorine and cyanomethyl.

---

The invention relates to novel dyestuffs corresponding to the formula

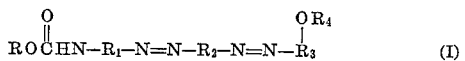 (I)

in this formula R represents an alkyl, aralkyl or aryl radical, $R_1$ and $R_2$ mean aryl radicals, $R_3$ stands for an aliphatic, aromatic-carbocyclic or aromatic-heterocyclic radical, in which the —$OR_4$ group is in an adjacent or in the p-position to the azo grouping, and $R_4$ stands for hydrogen or alkyl.

The new dispersion dyestuffs are obtained by diazotizing an aminoazo compound of the formula

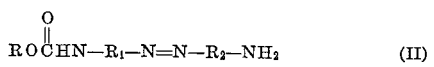 (II)

wherein R, $R_1$ and $R_2$ have the above indicated meaning, and combining with an enolic or phenolic coupling component in an adjacent or in the p-position to the hydroxyl group, the dyestuffs obtained are possibly alkylated and the starting components are selected in such a way that the final dyestuff contains no sulphonic acid and carboxylic acid groups. The dyestuffs may contain non-ionic substituents usual in dispersion dyestuffs.

The process for the production of the new dyestuffs may also be varied in such a manner that in dyestuffs of the formula

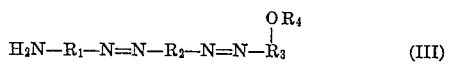 (III)

wherein $R_1$, $R_2$, $R_3$ and $R_4$ have the meaning given above, the $NH_2$ group is converted by a haloformic acid ester of the formula

hal—COOR wherein R has the meaning given above, and "hal" stands for a halogen atom, into the corresponding urethane compound, the starting components being selected in such a way that the final dyestuffs are free from sulphonic and carboxylic acid groups.

Aminoazo compounds of the Formula II are obtainable by known methods in that, for example an aminoaryl urethane of the formula

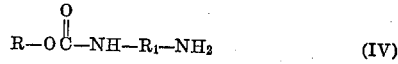 (IV)

wherein R and $R_1$ have the above given meaning, is diazotized and coupled with an arylamine of the formula $R_2$—$NH_2$, preferably in the p-position to the amino group.

Suitable enolic and phenolic coupling components with which the diazo compounds of amines of the Formula II are combined are for example those of the phenol, naphthol, 5-pyrazolone, acylacetic acid amide and hydroxyquinoline series; by way of example, the compounds may be specified as follows:

1-hydroxybenzene,
1-hydroxy-2-methylbenzene,
1-hydroxy-3-methylbenzene,
1-hydroxybenzene-2-carboxylic acid methyl ester,
1-hydroxybenzene-2-carboxylic acid ethyl ester,
1-hydroxybenzene-2-carboxylic acid amide,
1-hydroxy-2-methoxybenzene,
1-hydroxy-4-methylbenzene,
1-hydroxy-4-ethylbenzene,
1-hydroxy-4-propylbenzene,
1-hydroxy-4-i-propylbenzene,
1-hydroxy-4-butylbenzene,
1-hydroxy-4-i-butylbenzene,
1,3-dihydroxybenzene,
1-hydroxy-3-methoxybenzene,
1-hydroxy-3-chlorobenzene,
1-hydroxy-3,5-dimethylbenzene,
1-hydroxy-3,6-dimethylbenzene,
1-hydroxynaphthalene,
2-hydroxynaphthalene,
2-hydroxy-8-aminonaphthalene,
2-hydroxynaphthalene-3-carboxylic acid methyl ester,
2-hydroxynaphthalene-3-carboxylic acid-anilide,
3-methylpyrazolone-(5),
1-phenyl-3-methyl-pyrazolone-(5),
1(2',5'-dichlorophenyl)-3-methyl-pyrazolone-(5),
2-methyl-4H-pyrazolo-[1,5-a]-benzimidazole,
cyanoacetic acid amide,
acetoacetic acid amide,
acetoacetic acid anilide,
1-methyl-4-hydroxy-quinolone-(2),
2,4-dihydroxyquinoline and barbituric acid.

Amines of formula IV suitable for the synthesis of the aminoazo dyestuffs of Formula I are inter alia:

1-amino-4-carbomethoxyaminobenzene,
1-amino-4-carboethoxyaminobenzene,
1-amino-4-carbopropoxyaminobenzene,
1-amino-4-carbobenzyloxyaminobenzene,
1-amino-4-carbocyclohexyloxyaminobenzene,
1-amino-4-carbophenoxyaminobenzene,
1-amino-2-chloro-5-carbomethoxyaminobenzene,
1-amino-3-chloro-4-carbomethoxyaminobenzene,
1-amino-3-carbomethoxyaminobenzene,
1-amino-3-carboethoxyaminobenzene.

Suitable coupling components $R_2$—$NH_2$ are: aniline, 1-amino-3-methylbenzene,
1-amino-3-chloromethylbenzene,
1-amino-3-hydroxymethylbenzene,
1-amino-3-cyanomethylbenzene,
1-amino-3,5-dimethylbenzene,
1-amino-3,6-dimethylbenzene,
1-amino-3-methyl-6-methoxybenzene,
1-amino-3,6-dimethoxybenzene,
1-amino-3,6-diethoxybenzene, 1-amino-3-methoxybenzene,
1-amino-3-ethoxybenzene,
1-aminonaphthalene,
1-aminonaphthalene-2-methyl ether,
1-amino-naphthalene-2-ethyl ether,
1-amino-5-hydroxynaphthalene,
1-amino-5,6,7,8-tetrahydronaphthalene.

Starting dyestuffs of the Formula III can be prepared according to various methods of synthesis. Thus, for example, a compound acyl-HN—$R_1$—$NH_2$ can be diazotized and combined with a coupling component $R_2$—$NH_2$, again diazotized and finally coupled with an enolic or phenolic coupling component $R_3$—OH in an adjacent or in the p-position to the hydroxyl group; the acylamino group of the starting diazo compound can be hydrolysed in the course of or after this process. It is also possible to couple a diazo compound of an amine

with an aminoaryl compound $R_2$—$NH_2$, to diazotise again the aminoazo dyestuff obtained and combine it with an amine $R_1$—$NH_2$. It is also possible to couple a tetrazo compound of an aryldiamine $H_2H$—$R_2$—$NH_2$ unilaterally with a phenolic or enolic component

and then with an aminoaryl compound $R_1$—$NH_2$ to give the disazo compound, or to combine the diazo compound of a p-nitroarylamine or of a p-acylphenylene-diamine unilaterally with a phenolic or enolic component $R_3OH$, and finally to couple it, after saponification of the acylamino group or reduction of the nitro group, with an aminoaryl compound $R_1NH_2$ to give the disazo dyestuff.

The formation of the urethane compounds by the reaction of the amino group-containing dyestuff or intermediary dyestuff product with a haloformic acid ester is carried out by methods known as such, for example in an organic solvent, for example dioxan, and an acid-binding base, e.g. triethylamine, dimethylaniline, pyridine, or also in a solution of this base alone, e.g. in dimethylaniline.

The coupling of the various starting components is carried out, depending on the type of the diazo and coupling component, in an aqueous, aqueous-organic or organic medium, at temperatures of preferably 0° to 40° C., whereby the components may be present wholly or partly in solution or also in dispersion. As organic or aqueous-organic reaction media, there are used inter alia: alcohol, dioxan, acetone, pyridine etc.

As a selection (not meaning a limitation) of non-ionic substituents which may be contained in the radicals $R_1$, $R_2$ and $R_3$, the following may be mentioned: —$CH_3$, $ClCH_2$—, $CNCH_2$—, —$OCH_3$, —$OC_2H_5$, —$CF_3$, —$CCl_3$, —$NO_2$, —Cl, —Br, —I, —CN, —$COOCH_3$,

—$COOC_2H_5$

—$CONH_2$, —$CON(CH_3)_2$, —$SO_2CH_3$, —$SO_2NH_2$, —$SO_2N(CH_3)_2$, —$NHCOCH_3$, —$NHCOOCH_3$, —$SCH_3$, —$SC_2H_5$, —$C_6H_5$, —$C_6H_{11}$.

The medium for the reaction of the starting components is dependent on the type of the reaction partners. For the reaction with amino group-containing coupling components an acid to neutral pH range is in general chosen, whilst the reaction with hydroxyl group-containing coupling components is preferably carried out in an alkaline or neutral range. The reaction of the amino group-containing dye-stuffs with a haloformic acid ester is effected in a pH range of expediently 7–8.

An alkylation of the dyestuffs III in which $R_4$ stands for a hydrogen atom is sometimes desirable and is expediently carried out in such a way that an aqueous-alkaline solution of the dyestuff is reacted with alkylating agents, such as dialkyl sulphates.

The dyestuffs obtainable according to the present process are valuable products which are excellently suited for the dyeing, and printing of hydrophobic materials, especially of fibre materials of aromatic polyesters, such as polyethylene terephthalates and polyesters of terephthalic acid and 1,4-bis-hydroxymethyl-cycloehxane, cellulose-2½ and triacetate, synthetic superpolyamides and superpolyurethanes and polyacrylonitrile. Because of their low solubility, the dyestuffs are preferably employed in aqueous dispersions, for which the customary adjuvants, such as sulphonated naphthalene-formaldehyde condensation products, sulphite celluose decomposition products, soaps, polyglycol ethers of fatty acid amides, condensation products of higher alcohols and ethylene oxide etc. are used. Especially on aromatic polyesters, cellulose esters and superpolyamides, dyeings and prints of excellent fastness properties, such as fastness to light, heat setting, ironing, sublimation and water are obtained.

The following examples are given for the purpose of illustrating the present invention.

Example 1

8.3 parts by weight 1-amino-4-carbomethoxy-aminobenzene are dissolved in 50 parts by volume of water and 15 parts by volume of hydrochloric acid (36%) at 50° C. The mixture is then cooled with ice to 18° C. and 35 parts by volume sodium nitrite (10%) are allowed to run in. After 15 minutes a few drops of an amidosulphonic acid solution are added to destroy any nitrite which may still be present, and the clear solution is run whilst stirring into a solution of 5.4 parts by weight 1-methyl-3-aminobenzene in 200 parts by volume of water and 15.5 parts by volume hydrochloric acid (36%). The temperature is gradually raised to 40° C. and about 75 parts by volume of a 30% aqueous solution of sodium acetate are added until the pH value amounts to 3.5. After 2 hours the coupling is completed; the precipitated dyestuff is filtered off with suction, stirred with 250 parts by volume of a 2% hydrochloric acid solution and again filtered off with suction.

The filter cake is then stirred with 500 parts by volume of water and 15.5 parts by volume of hydrochloric acid (36%) to a fine suspension. 35 parts by volume of a 10% sodium nitrite solution are allowed to run in within 20 minutes at a temperature of 20° C., and the temperature is raised to 40° C. in the course of a further 20 minutes. Any remaining nitrite is destroyed, if necessary, by a few drops of an amidosulphonic acid solution. The diazo solution is clarified and slowly introduced with addition of ice, into a solution of 5.2 g. phenol in 200 parts by volume of water, 2 g. of NaOH and 20 g. of calcined sodium carbonate. The dyestuff which corresponds to the formula

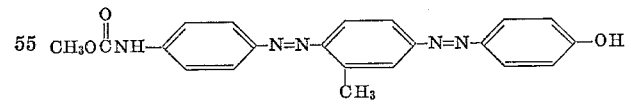

separates and, after the solution has been stirred for one hour and heated to 60° C., filtered off with suction, washed with water and dried. 16 parts by weight of a red-brown powder are obtained.

Synthetic fibres, e.g. polyterephthalic acid glycol ester fibres, triacetate or polyamide fibres, are dyed in reddish-yellow shades which are very fast to light, washing and sublimation.

For the dyeing of polyterephthalic acid glycol ester fibres, the dyestuff is brought into a fine dispersion by means of dispersing agents, pasted with water and added to the dye liquor. Polyester fibres are dyed with 1% of the dyestuff (referred to the weight of the polyester fibre), expediently with the addition of 5 g. of a carrier, for example cresotic acid methyl ester, per litre of dye liquor.

The 1-amino-4-carbomethoxyaminobenzene used in this example as starting compound can be obtained by the following methods:

Method 1.—6000 parts by weight of a chlorobenzene solution containing 984 parts by weight 4-nitrophenyl isocyanate, are mixed dropwise, with stirring, at 50° C., in the course of about 1½ hours, with 300 parts by weight methanol. The resulting urethane

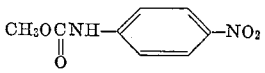

is precipitated. After stirring for two hours, the product is filtered off with suction, covered with methanol and dried at 80° C. 1,107 parts by weight 4-carboxymethylamino-1-nitrobenzene of melting point 176–177° C. are obtained (yield 99.1% of the theoretical).

Method 2.—27.6 parts by weight 4-nitroaniline are dispersed in 40 parts by weight dimethylaniline. 28.4 parts of chloroformic acid methyl ester are slowly added dropwise at 50° C. within 1 hour. Stirring is continued for 2 hours at 50° C. Crystals separate. 250 parts by volume of water and 8 parts by volume of 36% hydrochloric acid are added, the precipitate is filtered off with suction, washed with water, covered with methanol and dried at 80° C. 32 parts by weight of 4-carboxymethylamino-1-nitrobenzene of M.P. 176–177° C. are obtained (yield 82% of the theoretical). The nitro compound is reduced with hydrogen and addition of Raney nickel (M.P. 92–93° C.).

Example 2

11.6 parts by weight 4-carbophenoxyamino-1-aminobenzene are dissolved in 50 parts by volume of glacial acetic acid and 15 parts by volume of 35% hydrochloric acid, and the solution is introduced into 200 parts by volume of ice water. 35 parts by volume of a 10% sodium nitrite solution are then added. The solution is filtered off from some resin particles, introduced into a solution of 5.9 parts by weight 1-methyl-3-aminobenzene in 200 parts by volume of water and 15 parts by volume of 35% hydrochloric acid and coupled at 40° C., whilst being buffered with a 30% sodium acetate solution (to a pH value of 3.5), in the course of 2 hours. The resulting and precipitated dyestuff is filtered off with suction, washed with 5% hydrochloric acid, then dissolved in 150 parts by volume of glacial acetic acid and 15 parts by volume of 35% hydrochloric acid and diazotized at 0° C., while cooling, with 35 parts by volume of a 10% sodium nitrite solution. After 1 hour a small excess of nitrite is destroyed in the usual manner and the solution coupled at 0° C. in the course of 3 hours with 6 parts by weight phenol, dissolved in a dilute sodium hydroxide solution and 200 parts by volume of ice water (altogether 120 parts by weight of caustic soda). When the coupling is completed, the mixture is adjusted to pH 7, the precipitated dyestuff of the formula

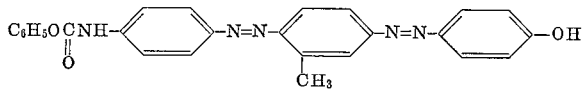

filtered off with suction, thoroughly washed with water and dried. 12 grams of a brown powder are obtained which dyes polyester, polyamide and triacetate fibres in orange shades which are very fast to light, washing and sublimation.

The 4-carbophenoxyamino-1-aminobenzene is prepared in the following manner: 69 parts by weight 4-nitroaniline are dissolved in 100 parts by weight dimethylaniline and slowly mixed at 50–70° C. with 83 parts by weight of chloroformic acid phenyl ester. After 2 hours, the mixture is cooled to room temperature and precipitated with 300 parts by volume of 10% hydrochloric acid, the precipitate filtered off with suction and recrystallised from chlorobenzene. 90 Parts by weight (70% of the theoretical) of 4-carbophenoxyamino-1-nitrobenzene of M.P. 163–164° C. are obtained.

Analysis.—N calculated 10.85%. Found 10.97%.

For the purpose of reduction, for example, 85 parts by weight of the nitro compound are dissolved in 370 parts by volume of tetrahydrofuran and treated with 30 parts by weight of Raney nickel for 2 hours at 60° C. After removal of the catalyst and evaporation of the tetrahydrofuran, 65 parts by weight (92% of the theoretical) of 4-carbophenoxyamino-1-aminobenzene of M.P. 133–134° C. are obtained.

Analysis.—N calculated 12.25%. Found 12.22%.

Example 3

8.3 Parts by weight 3-carbomethoxyamino-1-aminobenzene are dissolved in 50 parts by volume of water and 15 parts by volume of 35% hydrochloric acid at 50° C., cooled with 50 g. of ice to 18° C. and diazotized introducing 35 parts by volume of 10% sodium nitrite within 15 minutes. After removal of a small excess of nitrite the clear solution is coupled with a solution of 5.9 parts by weight 1-methyl-3-aminobenzene in 200 parts by volume of water and 15.5 parts by volume of 35% hydrochloric acid at 40° C., while buffering with 75 parts by volume of a 30% sodium acetate solution at pH 3.5 for 2 hours. The dyestuff formed is filtered off with suction, stirred with 250 parts by volume of 2% hydrochloric acid and filtered off with suction. The filter cake is stirred with 500 parts by volume of water and 15.5 parts by volume of 35% hydrochloric acid to a fine dispersion and diazotized at 40° C. with 35 parts by volume of 10% sodium nitrite in the course of 20 minutes. A small excess of nitrite is destroyed, the solution clarified by filtration and coupled at pH 8 with a solution of 5.2 parts by weight phenol in 200 parts by volume of water and 2 parts by weight NaOH and 20 parts by weight calcined sodium carbonate. The dyestuff

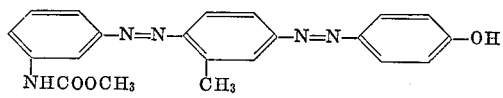

is precipitated; the solution is heated after 1 hour to 60° C. and the separated dyestuff filtered off with suction, washed and dried. 12 grams of a red-brown powder are obtained which dyes polyester, polyamide and triacetate fibres in yellow shades which are very fast to light, washing and sublimation, but somewhat less reddish than those of the dyeings obtained according to Example 1.

The 3-carbomethoxyamino-1-aminobenzene can be prepared in a manner analogous to that described in Example 1 for the preparation of 4-carbomethoxyamino-1-aminobenzene. The nitro compound has a melting point of 150–151° C. and the amine a melting point of 70–71° C.

Example 4

4 parts by weight of the dyestuff described in Example 1 are dissolved in 150 parts by volume of a 10% sodium hydroxide solution and slowly mixed at 0° C. with 6 parts by weight of dimethyl sulphate. The alkylation sets in gradually whereby the alkylated dyestuff

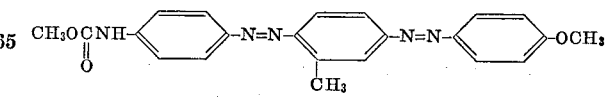

is precipitated from the solution. After 4 hours, the product is filtered off with suction, washed with water and dried. 4 parts by weight of a red-brown powder are obtained which dyes polyester, polyamide and triacetate fibres in reddish-yellow shades which are very fast to light, washing and sublimation, but somewhat more reddish and clearer than those of the nonalkylated dyestuff.

Example 5

10 parts by weight of the dyestuff

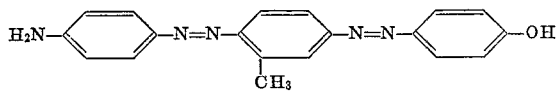

are dissolved in 50 parts by weight dimethylaniline at 60° C. and mixed dropwise with 7 parts by weight of chloroformic acid methyl ester. When in a sample of the dyestuff the capability of being diazotized has disappeared, which is the case after about 2 hours, 200 parts by volume of water and 30 parts by volume of 35% hydrochloric acid are admixed. The precipitated dyestuff is filtered off with suction, washed with 10% hydrochloric acid and water and dried. 11 grams of a red-brown powder are obtained. The dyestuff is identical with the final product described in Example 1.

Example 6

15.3 parts by weight 4-acetylamino-1-aminobenzene are dissolved in 300 parts by volume of water and 35 parts by volume of hydrochloric acid (35%) and diazotized at 5° C. with 69 parts by volume of 10% sodium nitrite. The filtrated diazo solution is coupled at 0° C. with 10 parts by weight phenol, dissolved in 400 parts by volume of water and 4 parts by weight of sodium hydroxide. After 2 hours the dyestuff formed is precipitated with acetic acid and filtered off with suction. To split off the acetyl group, the dyestuff is dissolved in 500 parts by volume of water and 10 parts by weight of caustic soda, filtered and heated at 90° C. for 8 hours. The saponified dyestuff is precipitated with acetic acid and washed with water. 26 parts by weight of the dyestuff are obtained. For further diazotisation, it is dissolved in 500 parts by volume of water and 4 parts by weight of caustic soda and mixed with 70 parts by volume of 10% sodium nitrite; the solution is then poured into 200 parts by volume of ice water and 50 parts by volume of 35% hydrochloric acid. The diazo compound is precipitated, unreacted nitrite is removed by a few drops of an amidosulphonic acid solution and the suspension is poured into a solution of 11 parts by weight 1-methyl-3-aminobenzene in 50 parts by volume of glacial acetic acid and 300 parts by volume of water. By the addition of a sodium carbonate solution the pH value is adjusted to 7, at which the coupling takes place. The dystuff is filtered off with suction after 3 hours, washed with water and dried. 20 parts by weight of the dyestuff are obtained. The dyestuff is diazotisable. For the reaction with chloroformic acid ester it is dissolved hot in 100 parts by volume of dimethylaniline and 150 parts by volume of dioxan. Insoluble parts are filtered off. For dissolution, 10 parts by weight chloroformic acid methyl ester are then added dropwise at 50–70° C. within 1 hour. After stirring has been continued for 2 hours, the mixture is cooled to room temperature and stirred into 1 litre of 10% hydrochloric acid. The precipitate is first washed with dilute hydrochloric acid, then with water, the product is dried and triturated with petroleum ether. 9 parts by weight of the dyestuff of the formula

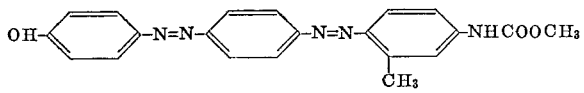

are obtained which dyes polyester, polyamide and triacetate fibres in reddish-yellow shades which are very fast to light, washing and sublimation.

Example 7

8.3 parts by weight 4-carbomethoxyamino-1-aminobenzene are dissolved at 50° C. in 50 parts by volume of water and 15 parts by volume of 35% hydrochloric acid and diazotized at room temperature with 35 parts by volume of a 10% sodium nitrite solution. The clear diazo solution is added to a solution of 8 parts by weight of 1-naphthylamine in 50 parts by volume of glacial acetic acid and coupled at room temperature at a pH value which is maintained at 3.5 by the addition of a sodium acetate solution. After 3 hours the dyestuffs is filtered off with suction, washed with 5% hydrochloric acid, then suspended in 150 parts by volume of glacial acetic acid, mixed with 35 parts by volume of a 10% sodium nitrite solution and then with 15 parts by volume of 35% hydrochloric acid. A solution results which is filtered off from a small quantity of impurities and added to a solution of 6 parts by weight phenol in a dilute solution of sodium hydroxide. The coupling takes place at 0° C. and at a pH value which is maintained at 9 by further adding a dilute sodium hydroxide solution. The precipitated dyestuff

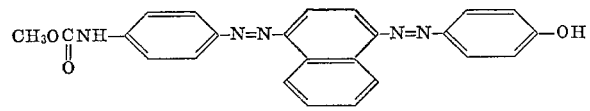

is filtered off with suction, washed with dilute acetic acid and water and dried. 13 parts by weight of a red-brown powder are obtained which dyes polyester, polyamide and triacetate fibres in red-brown shades which are very fast to light, washing and sublimation.

Example 8

8.3 parts by weight 4-carbomethoxyamino-1-aminobenzene are coupled, as described in Example 1, with 5.9 parts by weight 1-methyl-3-aminobenzene and subjected to further diazotisation. The clarified diazo solution is added to a solution of 6.7 parts by weight 1-phenyl-3-methyl-pyrazolone-(5) in 10 parts by volume of a 38% sodium hydroxide solution and 50 parts by volume of water. The resulting dyestuff corresponds to the formula

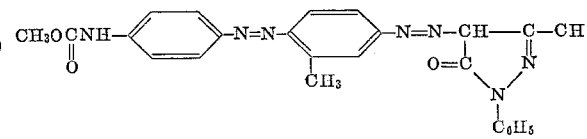

It is filtered off with suction, stirred with methanol and dried. 12 parts by weight of the dyestuff are obtained which dyes polyester, polyamide and triacetate fibres from an aqueous dispersion in intense yellowish orange shades of good general fastness properties.

Example 9

7.2 parts by weight 4-carbomethoxyamino-1-aminobenzene are diazotized in 100 parts by volume of water and 15 parts by volume of 35% hydrochloric acid with 30 parts by volume of a 10% sodium nitrite solution. The diazo solution is added to a solution of 6.7 parts by weight 1-amino-2,5-dimethoxybenzene in 100 parts by volume of water and 10 parts by volume of 25% hydrochloric acid. The mixture is buffered to a pH value of 3.5 by addition of sodium acetate. The precipitated dyestuff is filtered off with suction, slurried with 600 parts by volume of water and 15 parts by volume of 35% hydrochloric acid and diazotized with 30 parts by volume of a sodium nitrite solution (10%). The diazo solution is then added to a solution of 6.3 parts by weight of β-naphthol in 20 parts by volume of a 38% solution of sodium hydroxide and 100 parts by volume of water and coupled at a pH value of 8. The precipitated dyestuff is filtered off with suction and stirred with methanol. The dyestuff obtained dyes polyester fibres in violet shades.

In accordance with the methods of operation explained in the preceding examples, the dyestuffs listed in the following table can be prepared by using the stated starting components.

| Dyestuff | Shade on polyester fibres |
|---|---|
| NH—C₆H₃(COOCH₃)—N=N—C₆H₂(OCH₃)(OCH₃)—N=N—C₆H₃(OH)(CH₃) | Yellowish-red. |
| NH—C₆H₃(COOCH₃)—N=N—C₆H₂(OCH₃)(CH₃)—N=N—C₆H₂(OH)(CH₃) | Orange. |
| HN—C₆H₃(COOCH₃)—N=N—C₆H₂(OCH₃)(OCH₃)—N=N—C₆H₃—OH | Yellowish-red. |
| HN—C₆H₃(COOCH₃)—N=N—C₆H₃(CH₃)—N=N—C₆H₃(CH₃)—OH | Reddish-yellow. |
| HN—C₆H₃(COOC₂H₅)—N=N—C₆H₃(CH₃)—N=N—C₆H₃(CH₂CN)—OH | Do. |
| HN—C₆H₂(CH₃)(COOCH₃)(Cl)—N=N—C₆H₃(CH₃)—N=N—C₆H₃—OH | Red-orange. |
| HN—C₆H₂(COOCH₃)(Cl)—N=N—C₆H₃(CH₃)—N=N—C₆H₃(Cl)—OH | Yellow. |
| HN—C₆H₃(COOCH₃)—N=N—C₆H₂(OCH₃)(OCH₃)—N=N—C₆H₃(Cl)—OH | Brick red. |
| HN—C₆H₃(COOCH₃)—N=N—C₆H₃(CH₃)—N=N—CH(CO—NH)₂CO | Reddish-yellow. |
| NH—C₆H₃(COOCH₃)—N=N—C₆H₂(OCH₃)(OCH₃)—N=N—C₆H₂(Cl)(Cl)(OH) | Bluish-red. |
| NH—C₆H₃(COOCH₃)—N=N—C₆H₂(OCH₃)(CH₃)—N=N—C₁₀H₅(OH)(NH₂) | Currant. |
| NH—C₆H₃(COOCH₃)—N=N—C₆H₃(CH₂CN)—N=N—C₆H₃—OH | Reddish-yellow. |
| NH—C₆H₃(COOCH₃)—N=N—C₆H₃(CH₃)—N=N—CH(COCH₃)(COOC₂H₅) | Do. |

| Dyestuff | Shade on polyester fibres |
|---|---|
| 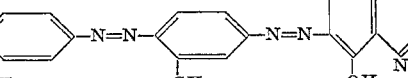 | Orange. |
| 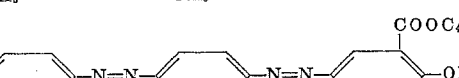 | Reddish-yellow. |
| 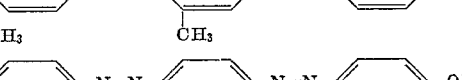 | Red-brown. |
| 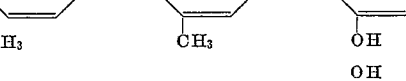 | Bluish-red. |
| 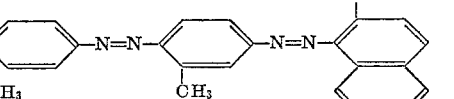 | Reddish-yellow. |
| 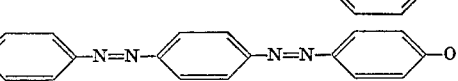 | Do. |
| 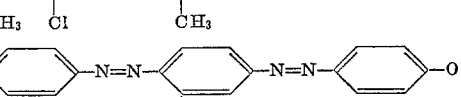 | Do. |
| 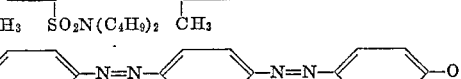 | Do. |
| 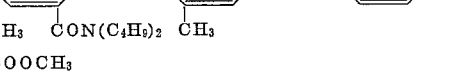 | Orange-brown. |

I claim:
1. A dyestuff of the formula

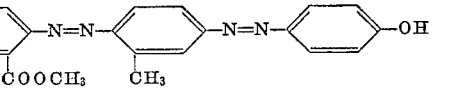

wherein R' stands for lower alkyl having 1 to 2 carbon atoms, X and X' stand for members selected from the class consisting of hydrogen, —$CH_3$, —Cl and carbomethoxy, Y stands for a member selected from the class consisting of hydrogen, methyl, methoxy and cyanomethyl, Z stands for a member selected from the class consisting of hydrogen and methoxy, W stands for a member selected from the class consisting of hydrogen and methyl, and V stands for a member selected from the class consisting of hydrogen, methyl, chlorine and cyanomethyl.

2. The dyestuff of the formula

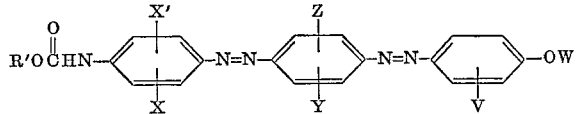

3. The dyestuff of the formula

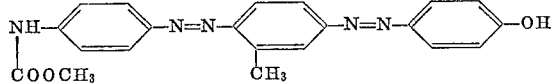

4. The dyestuff of the formula

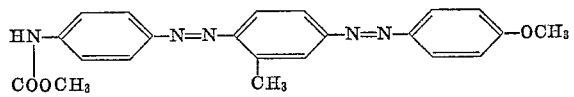

5. The dyestuff of the formula

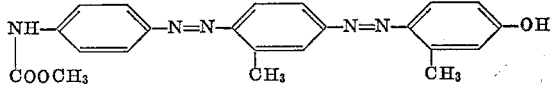

6. The dyestuff of the formula

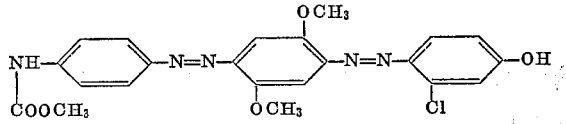

References Cited
UNITED STATES PATENTS 2,563,091   8/1951   Wright _____ 260—187
3,268,507   8/1966   Kruckenberg _____ 260—207

CHARLES B. PARKER, Primary Examiner.
DONALD M. PAPUGA, Assistant Examiner.

U.S. Cl. X.R.

8—41, 55; 260—37, 152, 155, 160, 176, 191, 196, 205, 207.1